(12) United States Patent
Goertz (10) Patent No.: US 7,086,674 B2
(45) Date of Patent: Aug. 8, 2006

(54) UNDERRIDE PROTECTION BUMPER FOR A TRAILER

(76) Inventor: Alan R. Goertz, 1072 W. Cook Rd., Grand Blanc, MI (US) 48439

( * ) Notice: Subject to any disclaimer, the term of this patent is extended or adjusted under 35 U.S.C. 154(b) by 0 days.

(21) Appl. No.: 11/087,401

(22) Filed: Mar. 23, 2005

(65) Prior Publication Data

US 2006/0119116 A1    Jun. 8, 2006

Related U.S. Application Data

(60) Provisional application No. 60/634,347, filed on Dec. 8, 2004.

(51) Int. Cl.
*B60R 19/38* (2006.01)

(52) U.S. Cl. ..................................... 293/132; 293/133
(58) Field of Classification Search ................ 293/132, 293/133
See application file for complete search history.

(56) References Cited

U.S. PATENT DOCUMENTS

| 4,359,239 A | 11/1982 | Eggert, Jr. |
| 4,988,258 A | 1/1991 | Lutz et al. |
| 5,507,546 A | 4/1996 | Holley |
| 6,109,675 A | 8/2000 | Sumrall |
| 6,116,667 A | 9/2000 | Torcomian |
| 6,604,765 B1 | 8/2003 | Eull |
| 6,764,116 B1 * | 7/2004 | Ledford et al. ............. 293/102 |
| 2001/0030431 A1 | 10/2001 | Killday |

* cited by examiner

*Primary Examiner*—Joseph D. Pape
(74) *Attorney, Agent, or Firm*—Jean M. McCarthy; Christopher W. Quinn; Quinn Law Group, PLLC (57) ABSTRACT

An underride protection bumper for a trailer is provided which functions as two separate bumpers during different stages of impact to provide optimal energy absorption, impact vehicle ride-down and underride protection characteristics. Another underride protection bumper provides a support member extending diagonally inboard to counteract inboard-directed forces on trailer attachment member, thereby absorbing impact energy and minimizing underride of an impacting vehicle.

15 Claims, 5 Drawing Sheets

UNDERRIDE PROTECTION BUMPER FOR A TRAILER

CROSS-REFERENCE TO RELATED APPLICATIONS

This Application claims the benefit of U.S. Provisional Application No. 60/634,347, filed Dec. 8, 2004, which is hereby incorporated by reference in its entirety.

TECHNICAL FIELD

This invention relates to an underride protection bumper for a truck or truck trailer.

BACKGROUND OF THE INVENTION

Truck trailers typically have a higher elevation than passenger vehicles. This presents a risk that a passenger vehicle will underride the trailer in an accident, potentially resulting in damage to the underriding vehicle and injury to occupants therein. Accordingly, Federal Motor Vehicle Safety Standards (FMVSS) require the installation of underride guards or bumpers on certain trailers. The underride guards must comply with certain deflection and energy absorption requirements. The art continues to strive for the design of an underride protection bumper that absorbs impacting energy and prevents vehicle underride in optimal fashion.

SUMMARY OF THE INVENTION

An underride protection bumper for a trailer of novel design is provided which effectively functions as two separate energy-absorbing bumpers at different stages of an impact, allowing an optimal combination of energy absorption capability, underride prevention and extended ride-down of the impacting vehicle.

Accordingly, an underride protection bumper for a trailer includes first and second substantially parallel, elongated trailer attachment members. The trailer attachment members are spaced from each other and each includes a proximal portion and a distal portion laterally extending from the proximal portion. In a preferred embodiment, the proximal portion and distal portion create a substantially L-shaped member. The proximal portion is adapted for connection to the trailer. An impact member spans between and is connected to the distal portions of the first and second trailer attachment members. The distal portions are relatively outboard of the proximal portions when the attachment members are connected to the trailer. Accordingly, the impact member is presented for energy-absorbing contact with an impacting vehicle.

The design of the underride protection bumper permits the impact member to cause the impacting vehicle to dissipate energy through deformation to the impacting vehicle. The impacting energy is also transferred to the proximal portions, which at some level of impact energy will plastically deform, pivoting away from the impact such that the distal portions are moved inboard of the proximal portions. The impact member maintains contact with the impacting vehicle throughout the pivoting motion. Once pivoting of the proximal portions is complete (which may be when the proximal portions abut the underside of the trailer), the distal portions are able to continue absorbing impact energy, allowing for a longer ride-down period for the impacting vehicle and minimizing further underride.

In one aspect of the invention, a brace member may be connected between the trailer attachment members. The brace member provides additional stability to the distal and proximate portions. The brace member may include a pair of cross member supports arranged in an X-shape connected between the distal portions, preferably in generally the same plane as the impact member. The X-shaped brace member prevents substantial lateral movement of the distal portions relative to the proximal portions.

Alternatively, the brace member may be corner elements spanning between the distal and the impact member. Yet another alternative brace member may be a horizontal member running generally parallel with the impact member. Such a horizontal brace member functions to stop rotation of the bumper at a position in which the distal positions are presented substantially vertically.

In another aspect of the invention, a supplemental impact member may be slidably adjustably positioned within the impact member to telescopically extend therefrom, thus effectively increasing the potential contact with an impacting vehicle. The supplemental impact member may be especially useful when the bumper is mounted to the trailer transversely, to absorb a side impact. In that instance, the supplemental impact member may extend to fill a gap between the impact member and the trailer wheels.

A truck trailer with an underride protection bumper includes first and second substantially parallel, energy-absorbing structures. Each of the structures has a substantially vertical upper portion and a substantially horizontal lower portion extending outboard from the upper portion. The upper portion is operatively connected to the trailer structure and extends downward therefrom. Preferably, the upper portion is both welded and bolted to the trailer structure. The lower portion is operatively connected to an impact member such that lower portion extends outboard of the upper portion and the impact member is presented in a first position at a level for engagement with an impacting vehicle. The energy-absorbing members absorb impact energy from the impacting vehicle, pivoting upon a high enough amount of impact energy such that the impact member is moved to a second position at which the lower portion is substantially vertical and is inboard of the upper portion. In the second position, the impact member remains substantially at the same level as in the first position and in engagement with the impacting vehicle to continue absorbing impact energy therefrom. Preferably, the upper and lower portions form a substantial L-shape. The truck trailer may be separable from a truck cab or an integral portion of a truck body and chassis.

In one aspect of the invention, the trailer and bumper combination includes first and second diagonal supports extending between the trailer structure and the upper portions of the first and second energy-absorbing structures, respectively, to provide additional strength and energy absorption capability. The diagonal support may extend diagonally inboard toward the upper portions. Alternatively, it may extend diagonally outboard toward the upper portions.

In another aspect of the invention, the trailer and bumper combination includes a cable connected at a first end to the upper portion of the first energy-absorbing structure and at a second end to the upper portion of the second energy-absorbing structure. The cable is restrained between the first and second ends by a structural member positioned at the trailer. Portions of the cable extend diagonally inboard between the structural member and the first and second ends. The cable responds in tension to an inboard-directed force upon the impact member. This tension may cause the structural member to also absorb impact energy. Additionally, the tensioned cable allows the transfer of energy from one of the energy-absorbing structures to the other energy-absorbing structure in the event of an offset impact (i.e., from the energy-absorbing structure nearest the impact to the energy-absorbing structure further from the impact).

Another embodiment of an underride protection bumper includes first and second substantially parallel, elongated trailer attachment members having vertical arms spaced apart from one another with an impact member spanning therebetween. Diagonal support members extend diagonally inboard from trailer structure, a buck plate, or other supportive structure, to the trailer attachment members. The diagonal supports are preferably portions of a continuous cable threaded through eyelets formed in the trailer structure or other support structure and in the trailer attachment members. An impacting vehicle directing an inboard force on the impact member will cause the diagonal supports to pull outboard in tension on the trailer attachment members, thus strengthening the bumper, which helps to slow and minimize underride of the vehicle and may transfer some of the impact energy through additional deformation to the trailer structure, buck plate or other supportive structure as well as from one of the trailer attachment members to the other trailer attachment member.

Still another embodiment of an underride protection bumper includes trailer structure, such as bogey slider rails and a pair of substantially parallel elongated trailer attachment members each having a proximal portion connected to the trailer structure. An impact member spans between the proximal portions such that it is presented for energy-absorbing contact with an impacting vehicle. A support member extends diagonally inboard between the trailer attachment members and the trailer structure. An inboard-directed force upon the impact member places the support member in tension to strengthen the bumper.

In one aspect of the invention, the support member is a cable connected at one end to the proximal portion of the first trailer attachment member and at the other end to the second trailer attachment member. A structural member, such as a buck plate, is positioned at the trailer and restrains the cable between the two ends so that it extends diagonally inboard from the structural member. The cable responds in tension to an inboard-directed force upon the impact member, thereby causing some of the impact energy to be absorbed by the structural member.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
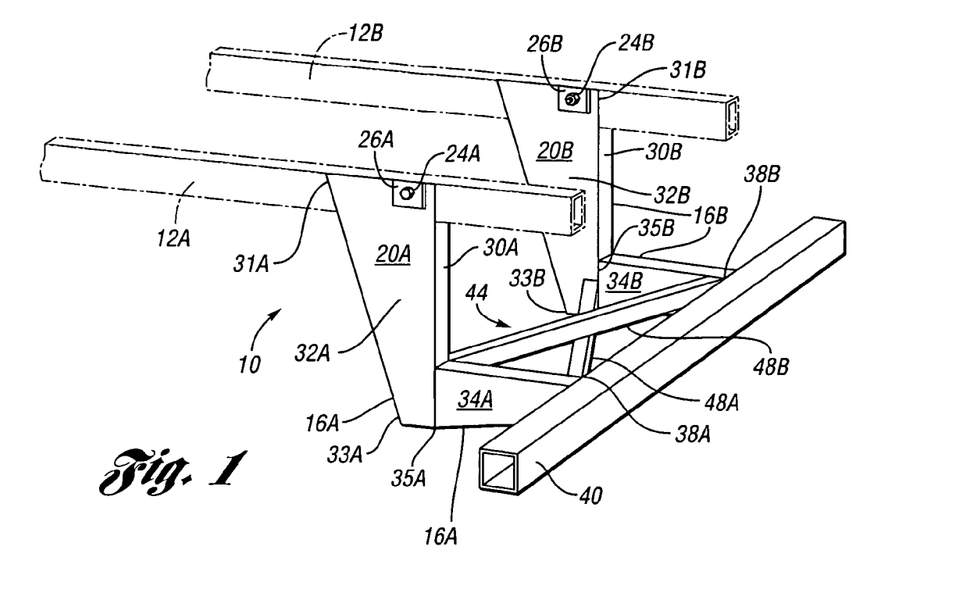
FIG. 1 is a schematic perspective view of a first embodiment of an underride protection bumper shown connected to trailer structure.
Figure 2:
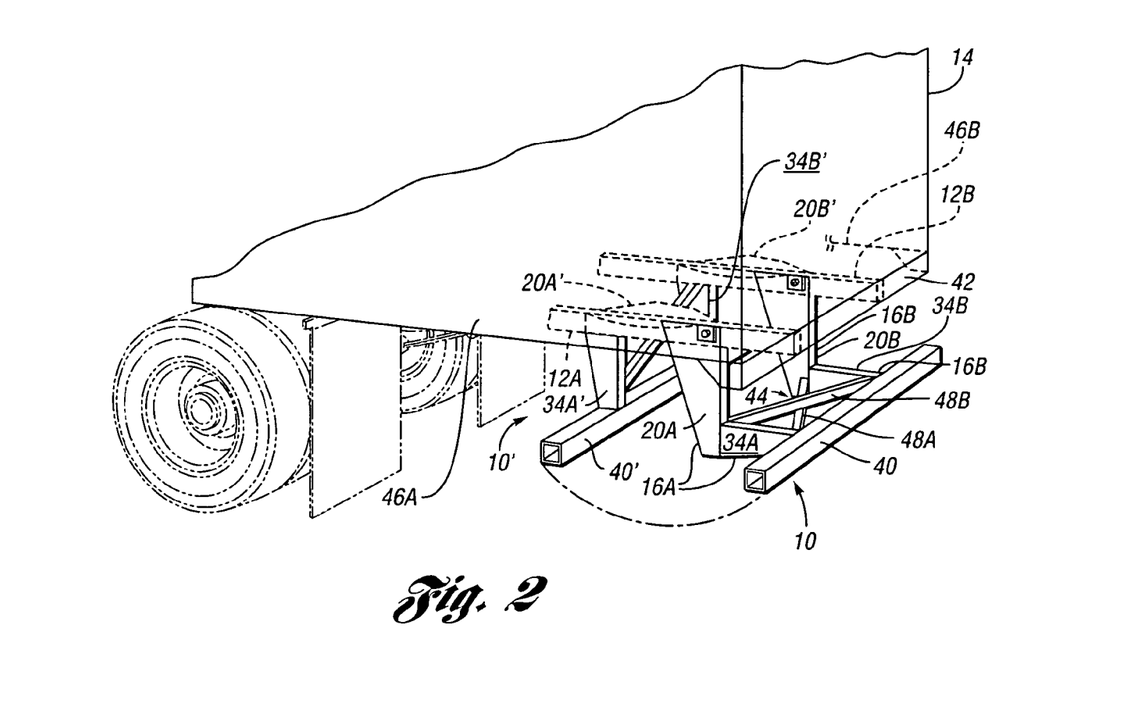
FIG. 2 is a schematic perspective illustration of the underride protection bumper for FIG. 1 with the trailer structure attached to a trailer and showing the bumper in first and second positions.

Referring to the drawings, wherein like reference numerals refer to like components, FIG. 1 shows an underride protection bumper 10 mounted to trailer structure 12A, 12B of a trailer (the trailer 14 being shown in FIG. 2). Structures 12A, 12B are preferably rails of a sliding tandem mechanism that allows a tandem axle suspension to be moved back and forth at the rear of a trailer, for the purpose of adjusting the distribution of weight between the axles, as will be understood by those skilled in the art. However, the trailer structure 12A, 12B may be any underbody or side trailer structure.

The bumper 10 includes first and second trailer attachment members 16A and 16B. The trailer attachment members 16A, 16B are also referred to herein as energy-absorbing structures. Each of the trailer attachment members 16A, 16B includes a respective proximal portion 20A, 20B which is also referred to herein as an upper or vertical portion or arm. The vertical arms 20A, 20B are preferably welded to the trailer structure 12A, 12B and also mounted thereto by pivot elements 24A, 24B which maybe reinforced shafts or bolts mounted transversely to the trailer structure 12A, 12B. Optional reinforcing elements 26A, 26B (which are preferably metal plates) are disposed between the pivot elements 24A, 24B and the vertical arms 20A, 20B. In FIG. 1, the reinforcing element 26A is visible on an outboard side of the vertical arm 20A while a reinforcing element 26B is visible on an inboard side of the vertical arm 20B. Preferably, a reinforcing element is also disposed on the inboard side of vertical arm 20A and another on the outboard side of vertical arm 20B. The vertical arms may be box beams, I beams, C-channel structures or may be tubular, as described below with respect to FIGS. 6 and 7. In either case, the vertical arms 20A, 20B have a shortened rear face 30A, 30B between opposing side faces 32A, 32B (only one side face of each vertical arm 20A, 20B being visible in FIG. 1) so that the trailer structure 12A, 12B nests between the side faces.

Each trailer attachment member 16A, 16B further includes a distal portion 34A, 34B, respectively, which is also referred to herein as a lower or horizontal portion or arm. The horizontal arms 34A, 34B extend laterally from the vertical arms 20A, 20B, respectively. Preferably, the horizontal arms 34A, 34B are welded to the vertical arms 20A, 20B to form a substantially outboard-extending L-shape. However, each trailer attachment member 16A, 16B may be a unitary component in which the respective vertical arms 20A, 20B and horizontal arms 34A, 34B are unified such as by a stamping or fluid forming process. The vertical arms 20A, 20B of FIG. 1 flare wider at wide ends 31A, 31B (positioned at the respective trailer structure 12A, 12B) than at respective narrow ends 33A, 33B (positioned at the respective horizontal arms 34A, 34B), creating a tapered wedge shape.

The horizontal arms 34A, 34B extend rearward from the vertical arms 20A, 20B, respectively. At a distal end 38A, 38B of the respective horizontal arms 34A, 34B, an impact member 40 is welded or otherwise attached such that it is presented in a substantially horizontal manner. The horizontal arms 34A, 34B are wider at wide ends 35A, 35B attached to the respective vertical arms 20A, 20B than at the narrow, distal ends 38A, 38B, creating a tapered, wedge shape. The horizontal arms 34A, 34B may be a box construction (4-sided), a C-channel construction (3-sided), tubular, or any other configuration providing appropriate strength and stability, including a solid or foam-filled member. Likewise, the impact member 40 has a box construction, but may alternatively have a C-channel, I beam or round tubular shape, or may be solid, foam-filled or any other construction known to those skilled in the art appropriate for an energy-absorbing impact member. In the embodiment shown in FIG. 1, the trailer attachment members 16A, 16B are L-shaped. However, a variety of other configurations (such as a more gradual J-shape or the like) that present the distal ends 38A, 38B below and rearward of the upper (attachment) ends of the vertical arms 20A, 20B may be employed.

An optional brace member 44 includes two supplemental cross member supports 48A, 48B welded between horizontal arms 34A, 34B. The cross member supports 48A, 48B provide lateral stability between the impact member 40 and the vertical arms 30A, 30B. They will assist in preventing "match boxing" (a condition where the impact member swings laterally as the horizontal arms pivot about the vertical arms thus "flattening out" the impact member against the proximal members). Without the cross member supports, match boxing is most likely to occur in the event the impact vehicle strikes the impact member 40 at an oblique angle. FIG. 1 depicts the cross members 48A, 48B as box beams, but they could equally preferably consist of beams having other shapes (such as an I-beam) as well as cables (see FIG. 10) or corner brackets (see FIG. 8). Additionally, the brace member 44 provides additional stability to the bumper 10, helping to synchronize movement of the spaced trailer attachment members 16A, 16B especially in an off-center impact, as well as to distribute impact energy within the bumper 10. In an alternative embodiment, no brace member is provided, and the bumper 10 includes the impact member 40 and the trailer attachment members 16A and 16B.

Preferably, the bumper 10 (including vertical arms 20A, 20B, horizontal arms 34A, 34B, impact member 40 and brace member 44) is formed from steel of appropriate strength, energy absorption and deformation characteristics to provide the dual position bumper function described herein, such as structural steel. Preferably, the material or materials utilized minimize the added weight of the bumper 10 to the trailer 14 while still exhibiting the requisite strength, energy absorption and deformation characteristics.

Referring to FIG. 2, the bumper 10 is shown mounted to trailer structure 12A, 12B at an underside of trailer 14 such that the impact member 40 is presented for contact or engagement with a vehicle impacting the trailer from the rear. Alternatively and within the scope of the invention the bumper 10 may be mounted to transversely positioned trailer structure such that the impact member 40 is presented for engagement with a vehicle impacting the trailer 14 from a side direction (see FIG. 9). Additionally, the vertical arms of the bumper may alternatively be mounted to a rear face 42 of the trailer 14. In those cases, the upper ends of the vertical arms of the bumper 10 may be modified to enable attachment at these alternative locations. Thus, the design of the bumper/trailer interface may vary depending on the geometry of the trailer undercarriage. The truck trailer 14 may be separable from a truck cab or integral with a truck body and chassis.

Figure 3:
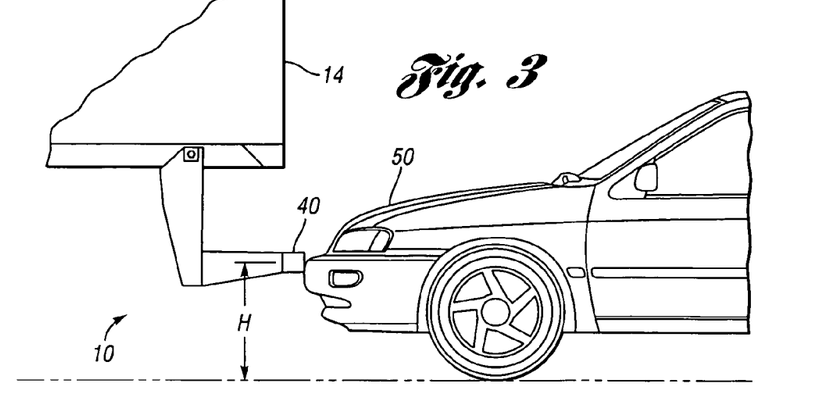
FIG. 3 is a schematic side view illustration of a vehicle impacting the bumper of FIGS. 1–2 with the bumper being shown in the first position.
Figure 4:
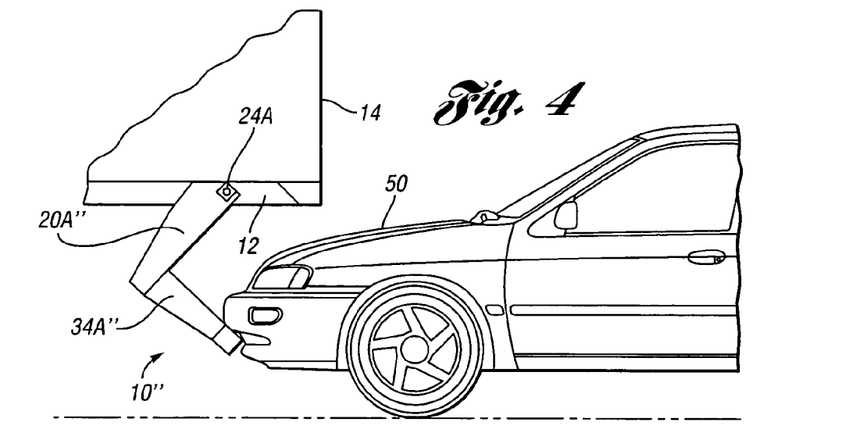
FIG. 4 is a schematic side view illustration of the bumper of FIGS. 1–3 with the vehicle of FIG. 3 advancing the bumper to an intermediate position.
Figure 5:
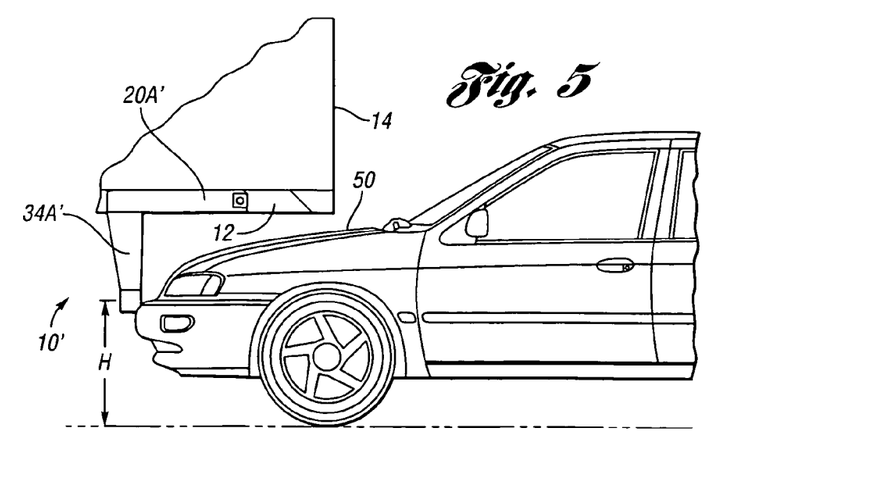
FIG. 5 is a schematic side view illustration of the bumper of FIGS. 1–4 with the vehicle of FIGS. 3–4 advancing the bumper to the second position of FIG. 2.

In FIG. 2, the bumper 10 is shown in a first or non-impact position in which the impact member 40 is disposed rearward of the trailer 14 for engagement with an impacting vehicle. Upon an impact (shown progressively in FIGS. 3–5) the bumper 10 absorbs impact energy in moving to a second position in which the bumper is referenced as 10' and the impact member is referenced as 40'. During an impact, as shown in FIGS. 3–5, the bumper 10 arcs inward and initially downward before rotating upward, thus prolonging the distance the bumper 10 is low enough to maintain contact with significant structure of the striking vehicle (e.g., vehicle bumper, frame, engine). The trailer attachment members 16A, 16B absorb impact energy and yield by plastic deformation in order for the bumper to reach the second position shown as 10'. Preferably, the vertical arms 20A, 20B shown in FIG. 1 remain welded to the trailer structure 12A, 12B during plastic deformation of the vertical arms 20A, 20B (shown deformed outward against an underside of the trailer in the second position 10'), creating a rotational pivot point below the welded attachment to the trailer structure 12A, 12B, allowing the bumper 10 to rotate to the second position shown at 10'. Importantly, the horizontal arms 34A, 34B, when loaded in compression in the first position, are designed to be stronger than the vertical arms 20A, 20B, loaded in bending in the first position. The horizontal arms 34A, 34B may be made stronger by utilizing a stiffer and/or thicker material. The wedge shape of the vertical arms 20A, 20B enables additional energy absorption capability at the area of likely deformation and pivoting (the wider end of the arms 20A, 20B, near trailer structure 12A, 12B). To provide additional support in the event of failure of the welds between the vertical arms 20A, 20B and the trailer structure 12A, 12B (due to sheer forces during the impact), the pivot elements 24A, 24B and reinforcing elements 26A, 26B maintain attachment of the trailer attachment members 16A, 16B with the trailer structure 12A, 12B and allow the bumper 10 to rotate about a pivot point at the pivot elements 24A, 24B to achieve the second position in which the bumper is shown as 10'.

Importantly, the bumper 10' continues to absorb impact energy in the second position. This is because the initially horizontal arms 34A, 34B are disposed substantially vertically (shown as 34A', 34B') when the bumper 10' is in the second position, similar to the vertical position of the vertical arms 20A, 20B when the bumper 10 is in the first position. In other words, when the vertical arms 20A, 20B have fully yielded, the horizontal arms 34A, 34B have rotated into position to become effectively vertical members. With the horizontal arms 34A', 34B' now in a substantially vertical position, the impact member 40' is still presented at a level appropriate to maintain contact with an impacting vehicle. The horizontal arms 34A', 34B' may then absorb energy and minimize further underride of the trailer by the impacting vehicle, thus allowing the bumper 10' to effectively function as a second energy-absorbing bumper in the second position. The continued dissipation of energy by the bumper 10' in the second position enables a softer ride-down for the impacting vehicle (shown in FIG. 5). The wedge shape of the horizontal arms 34A', 34B' affords a greater strength to the area likely to experience greatest stress (the end attached to vertical arms 20A', 20B').

Referring to FIGS. 3 and 5, it is noted that the impact member 40 is presented at a level or height H from the ground that is substantially equivalent in the first position as the height of impact member 40' in the second position. Thus, an impacting vehicle maintains contact with the impact member 40 in both positions as is shown and described with respect to FIGS. 3–5.

Referring to FIG. 3, an impacting vehicle 50 is shown engaging the impact member 40. The bumper 10 will absorb impact energy through yielding to begin pivoting as described above. Referring to FIG. 4, during the collision the bumper rotates through an intermediate position in which it is referenced as 10". At this point, the bumper has yielded from its position in FIG. 3 with the welds of the vertical arms failing and the bumper rotating about the pivot element 24A (only one vertical arm is visible in this position and is referred to as 20A" in this intermediate position). The horizontal arm is referred to as 34A" at this intermediate position. Depending on the characteristics of the impact, the vertical arm 20A may alternatively remain welded at the trailer structure 12A and deform along its length to achieve the intermediate stage and second position shown as 10" and 10' respectively.

In FIG. 5, the impact has caused the bumper to rotate to its second position shown as 10'. At this point, the impacting vehicle 50 has partially underridden the trailer 14. However, the horizontal arm 34A' has rotated to its second position (horizontal arm 34B' being in a like longitudinal position but not visible in this side view). At this point, a significant amount of the impact energy has been absorbed and the vehicle has experienced a gradual ride-down. Additional impact energy may now be absorbed by the horizontal portions 34A', 34B'. The welds or other attachment between the respective horizontal portions 34A', 34B' and vertical portions 20A', 20B' will provide further rigidity to allow the horizontal arms 34A' to continue to absorb energy when the bumper 10' is in the second position.

Figure 6:
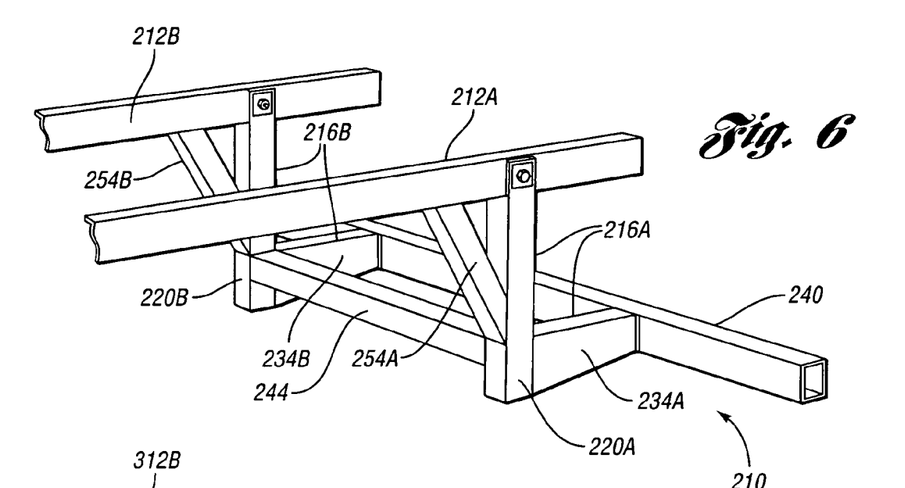
FIG. 6 is a schematic perspective illustration of a second embodiment of an underride protection bumper.

Referring to FIG. 6, another embodiment of an underride protection bumper 210 includes vertical arms 220A, 220B having a box-shaped cross section. Diagonal supports 254A, 254B are welded between trailer structure 212A, 212B and the respective vertical arms 220A, 220B. The diagonal supports 254A, 254B provide additional strength and energy absorption capability and may enable more energy absorption to occur during the deformation of the vertical arms 220A, 220B and rotation of the bumper 210 to a second position similar to that shown in FIG. 2. The diagonal supports 254A, 254B provide an energy absorption function similar to the wedge design of the vertical arms 20A, 20B of bumper 10 or FIG. 1. The diagonal supports should not deform in such a way as to interfere with bumper rotation into the second position 10' of FIGS. 2 and 5.

An optional single beam brace member 244 is welded to a lower end of the vertical arms 220A, 220B intermediate the trailer structure 212A, 212B and the impact member 240 and preferably perpendicular to the trailer attachment members 216A, 216B and parallel with the impact member 240. The brace member 244 provides additional stability to the bumper 210, helping to synchronize movement of the spaced trailer attachment members 216A, 216B especially in an off-center impact, as well as to distribute impact energy within the bumper 210. Additionally, the brace member 244 will interface with the underside of the trailer (not shown) when the bumper 210 rotates to a second position (such as the second position of FIG. 2), thus functioning as a stopper to stop rotation of the bumper 210 at the second position. For embodiments not having a horizontal brace member, lateral or transverse trailer structure at the underside of the trailer may act as a stopper to stop rotation of the bumper.

Figure 7:
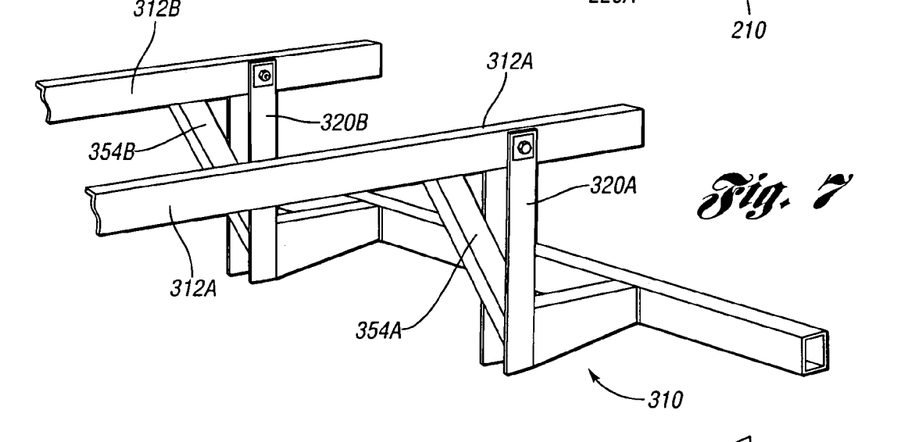
FIG. 7 is a schematic perspective illustration of a third embodiment of an underride protection bumper.

FIG. 7 shows yet another embodiment of an underride protection bumper 310 in which vertical arms 320A, 320B have a C-shaped cross section (i.e., they have a C-channel structure). Optionally, diagonal supports 354A, 354B are welded between trailer structure 312A, 312B and the vertical arms 320A, 320B to provide additional strength and energy absorption capability as described above with respect to diagonal supports 254A, 254B of FIG. 6. A brace member such as a cross member support-type brace member 44 of FIG. 1 or a horizontal brace member 244 of FIG. 6 is not depicted, but may optionally be used with the embodiment of FIG. 7.

Figure 8:
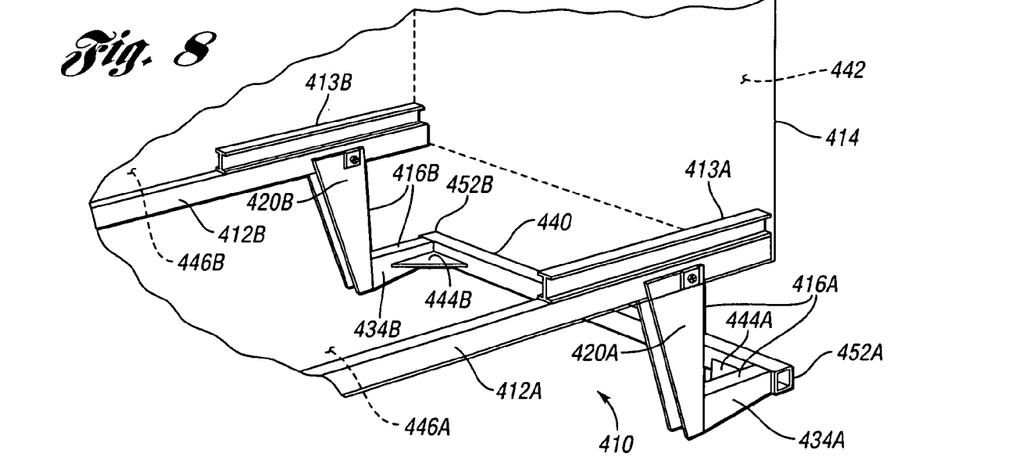
FIG. 8 is a schematic perspective illustration of a fourth embodiment of an underride protection bumper.

Referring to FIG. 8, another embodiment of an underride protection bumper 410 is depicted. The horizontal arms 434A, 434B of the trailer attachment members 416A, 416B are attached at or near the ends 452A, 452B of the impact member 440 (i.e., the trailer attachment members 416A, 416B are spaced apart approximately the length of the impact member 440.) The vertical arms 420A, 420B are connected to trailer structure 412A, 412B which runs along or in close proximity to the sides 446A, 446B of the trailer 414. The close proximity to the sides permit additional reinforcement of members 412A, 412B with structures 413A, 413B that will not significantly interfere with cargo area of the trailer.

The wide spacing of the trailer attachment members 416A, 416B has the advantage of not interfering with tandem axle (bogey) positioning as wheels (not shown) are slid to the rear of the trailer. Additionally, the wide spacing of trailer attachment members 416A, 416B alleviates the possibility of an offset vehicle (i.e., a vehicle not centered at the rear of the trailer 414) impacting outside of the vertical supports 420A, 420B, therefore enabling the bumper 410 to respond to the impact in the manner intended (i.e., to pivot as described with respect to bumper 10 of FIGS. 1-5).

Optional brace members in the form of corner elements 444A, 444B are depicted in this embodiment. The corner elements 444A, 444B span between respective horizontal arms 434A, 434B and the impact member 440 near the intersection thereof. The corner elements 444A, 444B provide additional structural stability between the horizontal arms 434A, 434B and the impact member 440 and, like the cross member supports 48A, 48B of FIG. 1, the corner elements 444A, 444B will reduce the likelihood of "match boxing." Optional reinforcing elements such as an added flange may be added to any portion of or the entire perimeter of the corner elements 444A, 444B. Additionally, the corner elements 444A, 444B may have an alternative beam-like shape rather than the plate-like shape depicted or may be corrugated for added strength.

Figure 9:
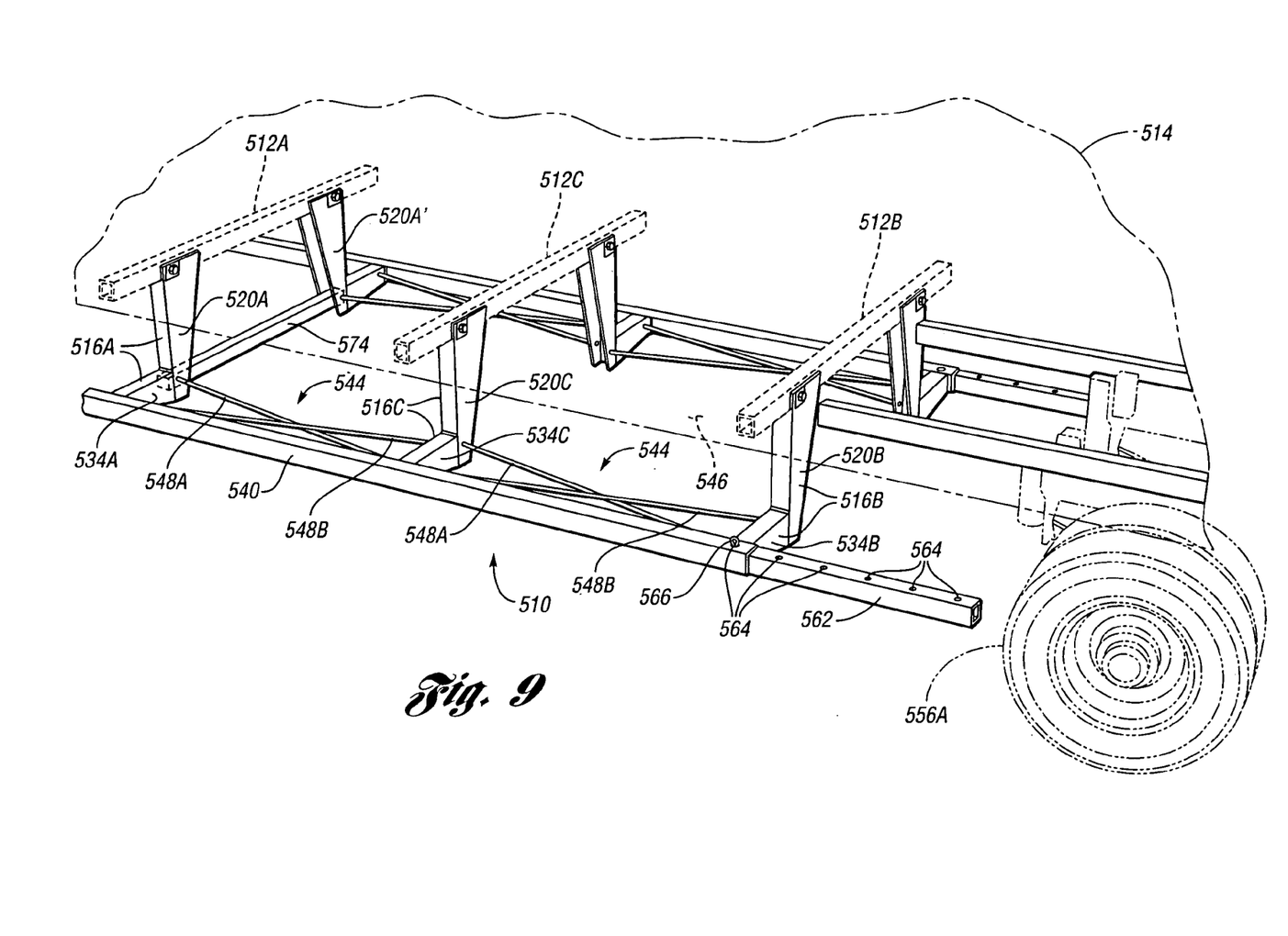
FIG. 9 is a schematic perspective illustration of a fifth embodiment of an underride protection bumper.

Referring to FIG. 9, another embodiment of an underride protection bumper 510 is depicted. (A duplicate bumper shown on the opposing side of the trailer 514 is a mirror image of bumper 510.) The bumper 510 is connected to transverse trailer structure 512A, 512B preferably by welding and bolting (as discussed with respect to bumper 10 of FIGS. 1–5). The underside of a trailer typically has beamlike transverse structure repetitively spaced at a given distance, such as 18 inches. Such typical beam structure may be reinforced as necessary to support the bumper 510 in order to serve as trailer structure 512A, 512B. Mounting the bumper 510 in this manner presents the impact member 540 even with the trailer side 546 to provide energy-absorbing capability and underride protection in the event of a side impact. Should the span between 516A and 516B be so large that the impact member 540 can not effectively transmit centered impact loads to 516A, 516B, one or more similar additional supportive trailer structure and attachment members, such as trailer structure 512C and trailer attachment member 516C, should be installed intermediate the trailer attachment members 516A, 516B. Optional brace members 544 are employed between adjacent trailer attachment members 516A, 516B and 516C through eyelets formed in horizontal arms 534A, 534B and 534C and/or in vertical arms 520A, 520B and 520C. The brace members 544 are of the cross member type as in FIG. 1, having cross member supports 548A, 548B. Preferably, the brace members 544 are cables, in order to minimize added weight. Box or tubular beam brace members or corner brackets may alternatively be employed. For instance, a horizontal-type single beam brace member as in FIG. 6 may be used. Optional transverse brace members 574 may be employed between vertical arms on opposing sides of the trailer to strengthen and increase energy absorption capability during an impact by transmitting loading to the opposing side bumper. FIG. 9 depicts 574 between members 520A and 520A', but other vertical arms could be reinforced in a similar manner. Members 574 may be box beam (shown), tubular, or other structure designed for axial loading.

Because the longitudinal position of the trailer wheels 556A may be adjusted to accommodate various loads, a variable gap exists between the more rearward trailer attachment member 516B and the wheels 556A. Accordingly, a telescoping supplemental impact member 562 extends from the impact member 540 to substantially span the width of this gap, thereby providing energy-absorbing capability and underride protection across the gap as well. The supplemental impact member 562 is formed with a plurality of spaced attachment openings 564. The supplemental impact member 562 is secured to the impact member 540 at a selected one of these opening 564 via a cotter pin 566 or other appropriate attachment device. Thus, the supplemental impact member 562 spans the gap created when the wheels 556A are moved to a rearward position.

Figure 10:
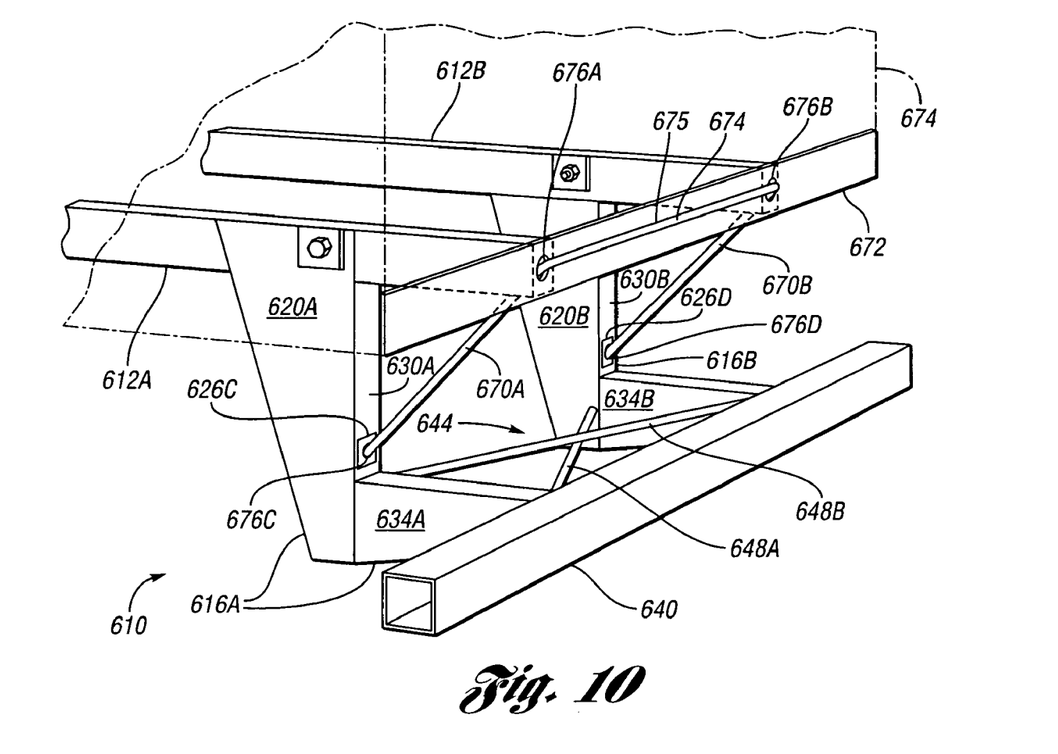
FIG. 10 is a schematic perspective illustration of a sixth embodiment of an underride protection bumper.

Referring to FIG. 10, another embodiment of an underride protection bumper 610 is depicted. The bumper 610 is configured similarly to bumper 10 of FIG. 1, with the addition of a rear diagonal supports 670A, 670B. The supports 670A, 670B may consist of supports similar to 254A, 254B of FIG. 6, except attached to the rear (outboard) surfaces 630A, 630B of the vertical arms 620A, 620B. Steel cables are permissible in this configuration since the supports 670A, 670B are loaded in tension during a rear impact. The cables offer a weight savings versus beam members. The upper portions of the rear diagonal supports 670A, 670B may be attached to energy-absorbing structure such as trailer structure 612A, 612B, a buck plate 672, or other substantial trailer structural members. The embodiment depicted shows the use of a single cable 674 looped through reinforced eyelets 676A, 676B in the buck plate 672. The single cable 674 includes diagonal support portions 670A, 670B and substantially horizontal midportion 675 therebetween. This configuration allows additional deformation energy to be absorbed through deformation of the buck plate 672 as vertical arms 620A, 620B pull on the cable.

During an offset impact with the impact member 640 (i.e., when the impacting vehicle is not centered with the bumper 610 so that only one of the trailer attachment members 616A or 616B is directly impacted), the cable 674 may allow transmission of deformation energy to the opposite vertical arm. As the impact-loaded vertical arm is deformed forward (inboard), the opposite vertical arm may be pulled rearward (outboard) by the continuous cable. Low friction devices such as pulleys (not shown) mounted to the buck plate 672 in the buck plate eyelets 676A, 676B may be employed to guide the cable, thus ensuring the desired interaction between trailer attachment members 616A, 616B. The low friction devices should be mounted in such a manner as to allow them to carry the loads generated by the cable. Two separate cables could be used in place of the continuous cable, but energy could not be transferred through the cables to the other opposite vertical arm during an offset impact. The cables could be secured to the bumper 610 by threading ends of the cables through reinforced eyelets, such as eyelets 676C, 676D (formed in respective vertical arms 620A, 620B) and flaring the ends of the cables in a manner which restricts the flares from passing through the eyelets 676C and 676D. The ends of the cables may instead be knotted or threaded through a loop holder or bolt to secure the cable at the eyelets. Preferably, the eyelets 676C and 676D are reinforced with reinforcing elements 626C, 626D, such as metal plates used as reinforcing elements in FIG. 1. It should be noted that the diagonal supports 670A, 670B should not be so strong as to cause the horizontal arms 634A, 634B to be deformed before the bumper 610 has rotated to the second position. The embodiment of FIG. 10 also employs an X-shaped brace member 644 having cross member supports 648A, 648B formed from cable similar to brace member 544 of FIG. 9.

Figure 11:
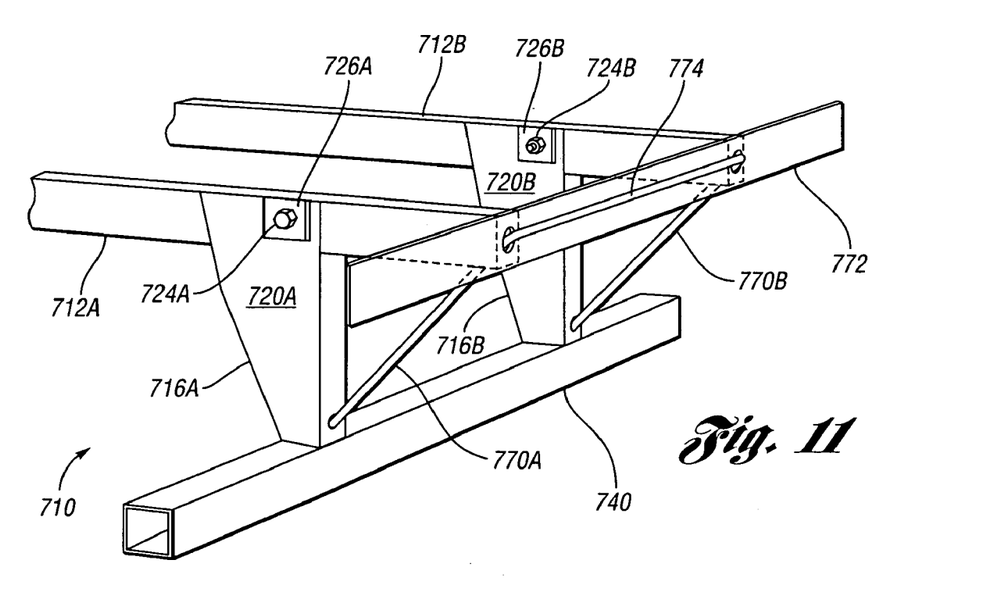
FIG. 11 is a schematic perspective illustration of a seventh embodiment of an underride protection bumper.

Referring to FIG. 11, another embodiment of an underride protection bumper 710 includes trailer attachment members 716A, 716B having vertical arms 720A, 720B extending downward from trailer structure 712A, 712B and attached thereto via welding and pivot elements 724A, 724B, which may be bolts reinforced with reinforcing elements 726A, 726B such as metal plates, as described with respect to FIG. 1. An impact member 740 spans between the vertical arms 720A, 720B at a lower end thereof. Diagonal support members 770A, 770B (portions of a cable 774) extend substantially diagonally inboard from a buck plate 772 to the vertical arms 720A, 720B. The buck plate 772 may also house tail lights and may support dock bumpers (not shown). Transverse trailer structure may be employed in lieu of a buck plate to support the support members 770A, 770B in a similar manner. The support members 770A, 770B are depicted as portions of a continuous cable threaded between eyelets formed in the buck plate 772 and in the vertical arms, as described with respect to FIG. 10. Alternatively, the support members 770A, 770B may have a variety of beam-like shapes (such as a box beam or an I-beam). Pulleys may be employed in conjunction with the support members 770A, 770B, as described with respect to FIG. 10. Separate cable sections may be used instead of a continuous cable to form the support members 770A, 770B.

A vehicle contacting the impact member 740 will direct an inboard force on the vertical arms 720A, 720B, tending to cause pivoting as discussed with respect to FIGS. 1 and 2. However, the diagonal support members 770A, 770B will counteract the inboard-directed force with an outboard pull on the vertical arms 720A, 720B, to strengthen the bumper and minimize underride of the impacting vehicle. The bumper 710 is shown mounted in a rearward mounted position to protect in the event of a rear impact, but may also be installed in a side position to protect in the event of a side impact. A telescoping supplemental impact member similar to supplemental impact member 562 of FIG. 9 may be slidably adjustable within the impact member 740 to extend the effective width of the impact member 740, and thereby increase the potential for energy-absorbing contact with an impacting vehicle.

As set forth in the claims, various features shown and described in accordance with the different embodiments of the invention may be combined.

While the best modes for carrying out the invention have been described in detail, those familiar with the art to which this invention relates will recognize various alternative designs and embodiments for practicing the invention within the scope of the appended claims.

The invention claimed is:

1. An underride protection bumper for a trailer comprising:
   first and second substantially parallel, elongated trailer attachment members, each having a proximal portion adapted for connection to the trailer and a distal portion laterally extending from said proximal portion;
   an impact member spanning between and connected to said distal portions; and
   said distal portions being substantially horizontal and relatively outboard of said proximal portions in one of a substantially rearward and a substantially lateral direction when said attachment members are connected to the trailer such that said impact member is presented at a level for energy-absorbing contact with an impacting vehicle; and said trailer attachment members being pivotable to move said impact member to a position in which said distal portions are substantially vertical and said impact member continues to be presented at said level for energy-absorbing contact with the vehicle.

2. The underride protection bumper of claim 1, further comprising:
   a brace member connected between said trailer attachment members.

3. The underride protection bumper of claim 2, wherein said brace member is an elongated member positioned substantially parallel with said impact member.

4. The underride protection bumper of claim 2, wherein said brace member includes a pair of cross member supports arranged with respect to one another in a general X-shape and connected between said distal portions to prevent substantial lateral movement of said distal portions relative to said proximal portions.

5. The underride protection bumper of claim 2, wherein said brace member includes first and second corner elements each spanning between and connected to said impact member and a respective one of said distal portions to provide additional structural stability therebetween.

6. The underride protection bumper of claim 1, wherein said proximal portion and distal portion of each of said trailer attachment members are positioned with respect to one another such that each of said trailer attachment members is generally L-shaped.

7. The underride protection bumper of claim 1, further comprising:
   an elongated, supplemental impact member connectable to said impact member and adjustable to extend therefrom, thereby effectively increasing potential contact with the impacting vehicle when said attachment members are connected to the trailer.

8. The underride protection bumper of claim 7, wherein said supplemental impact member is positioned at least partially within said impact member when it is connected thereto and extends telescopically therefrom when adjusted.

9. The underride protection bumper of claim 1, wherein at least one of said proximal portion and said distal portion of each said trailer attachment members is tapered from a wide end to a narrow end, said wide end providing increased energy-absorbing capability.

10. A truck trailer in combination with an underride protection bumper comprising:
    trailer structure;
    an elongated, substantially horizontal impact member;
    first and second substantially parallel, energy-absorbing structures, each having a substantially vertical upper portion and a substantially horizontal lower portion extending outboard from said upper portion in one of a substantially rearward and a substantially lateral direction; said upper portion being operatively connected to said trailer structure and extending downward therefrom; said lower portion being operatively connected to said impact member such that said impact member is presented in a first position at a level for engagement with an impacting vehicle; wherein said upper portion and said lower portion are a substantially similar length and are arranged in an L-shape; and
    said energy-absorbing members absorbing impact energy and being pivotable upon an amount of impact energy to move said impact member to a second position in which said lower portion is substantially vertical, is substantially inboard of said upper portion in one of a substantially forward and a substantially lateral direction, and remains substantially at said level due to said substantially similar length and in engagement with said impacting vehicle to continue absorbing impact energy.

11. The trailer and bumper combination of claim 10, further comprising:
    a brace member connected between said energy-absorbing structures.

12. The trailer and bumper combination of claim 11, wherein said brace member is an elongated member positioned substantially parallel to said impact member such that said brace member functions to stop pivoting of said energy-absorbing members when said impact member is at said second position.

13. The trailer and bumper combination of claim 10, further comprising:
    first and second diagonal supports extending between said trailer structure and said upper portion of said respective energy-absorbing structures to provide additional energy absorption capability.

14. The trailer and bumper combination of claim 10, further comprising:
    a cable connected at a first end to said upper portion of said first energy-absorbing structure and at a second end to said upper portion of said second energy-absorbing structure, said cable being restrained between said first and second ends by a structural member positioned at the trailer such that first and second portions of said cable extend diagonally inboard between said structural member and said first and second ends respectively;
    said cable responding in tension to an inboard-directed force of the impacting vehicle upon said impact member to allow transfer of deformation energy from one of said first and second energy-absorbing structures to the other of said first and second energy-absorbing structures in the event of an offset impact.

15. The trailer and bumper combination of claim 10, further comprising:
a first pivot element connecting said upper portion of said first energy-absorbing structure to said trailer structure; and
a second pivot element connecting said upper portion of said second energy-absorbing structure to said trailer structure; said energy-absorbing structures being pivotable about said pivot element.

* * * * *